March 1, 1966  E. GUTH  3,238,069
PRESSURE-RESISTANT GAS-DIFFUSION ELECTRODE
Filed Jan. 17, 1963

INVENTOR.
Egbert Guth
BY
Pierce, Scheffler & Parke
Attorneys

United States Patent Office 3,238,069
Patented Mar. 1, 1966

3,238,069
PRESSURE-RESISTANT GAS-DIFFUSION
ELECTRODE
Egbert Guth, Neuenhof, Switzerland, assignor to Aktiengesellschaft Brown, Boveri & Cie, Baden, Switzerland, a joint-stock company
Filed Jan. 17, 1963, Ser. No. 252,195
Claims priority, application Switzerland, Jan. 19, 1962, 631/62
1 Claim. (Cl. 136—120)

The invention relates to a pressure-resistant gas-diffusion electrode adapted to be immersed in an electrolyte, more particularly for fuel elements.

Known gas-diffusion electrodes for fuel elements take the form of porous catalytically active members, usually in the shape of a circular disc or cylinder, pressed or otherwise fastened in a conductive holder, using a packing. The holder then serves as a gas-feed and current-take-off. Between the holder and one side of the electrode there is an intermediate space, enabling the gas to be brought uniformly over one whole surface of the electrode. The opposite side of the electrode is adapted to be in contact with an ion-conducting electrolyte. The electrode itself is supported only at the edges, so that the gas-pressure necessary in order to maintain the three-phase boundary, representing the reaction zone, between the gas, the electrolyte and the electrode material acts on the whole surface area of the electrode.

Since the gas-pressure applied to a gas diffusion electrode is predetermined by the pore size, and since the mechanical strength of a porous sintered member is limited, the electrode cannot have an indefinitely large surface area. It is not advantageous to increase the thickness of the electrode, since this only involves poorer use of space in relation to the output of the fuel element.

The invention has the purpose of providing a gas-diffusion electrode of small specific volume in relation to the output delivered and with a high degree of pressure-resistance, being simple to produce and avoiding constructional elements such as packings and electrode-holders, which take up a lot of space and are liable to give trouble.

The gas-diffusion electrode according to the invention is characterized by gas-permeable carrier, preferably plane and serving as a gas-feed space, two fine-pored conductive layers secured to the said carrier and adapted to be in contact with the electrolyte, means for introducing the gas along the edges of the carrier, and means for taking off current from the fine-pored layers.

The invention will be more precisely explained with reference to the drawings.

Figure 1:
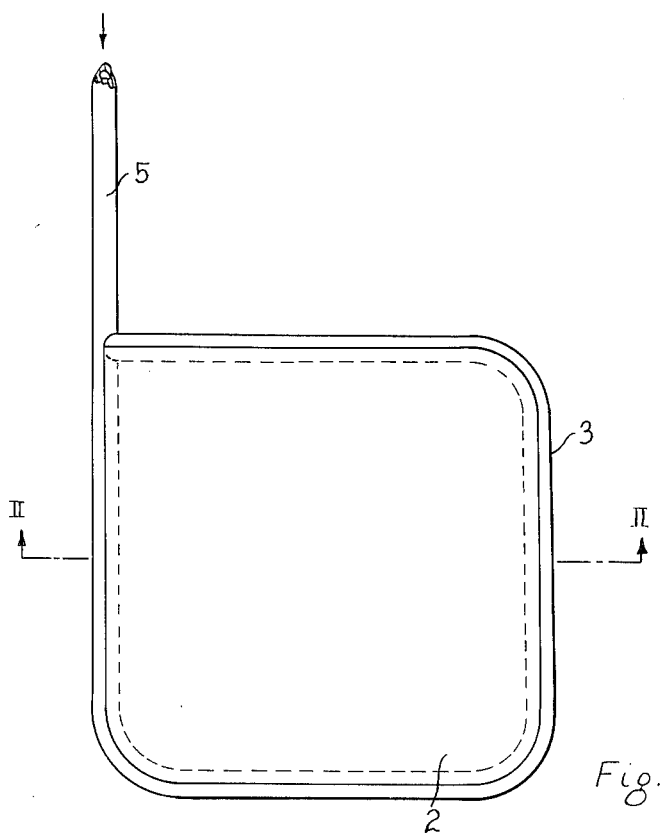
Figure 2:
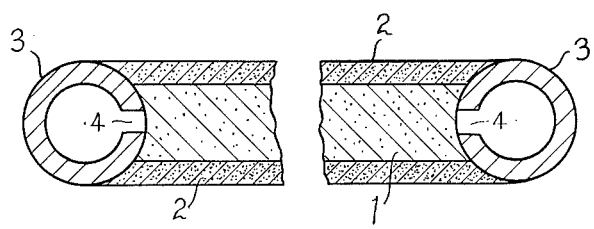

FIGURES 1 and 2 show an example of embodiment of the gas-diffusion electrode in plan view and in section.

1 designates the plane gas permeable carrier, which serves as a gas-feed spaced, and in the example of the embodiment shown is a coarse-pored sintered member. On both its surface, it is in contact with the fine-pored conductive layers 2, 2. Along the edges of the carrier 1 and the fine-pored layers 2, 2, is fitted a hollow-profiled frame 3. The frame 3 is provided with apertures 4 on its inner side directed towards the carrier. The frame 3 is connected with the tube 5 for the introduction of gas.

The carrier 1 serves only as a gas-feed space in the sense of a gas-pocket. For this reason, the carrier must not be made of a catalytically active material. The layers 2 secured to both sides of the carrier are the working layers as such, in or on which the three-phase boundary between the gas, the electrolyte and the electrode material is formed. These layers are preferably made of a catalytically active material. The gas-diffusion electrode is pressure-resistant, since the gas-pressure predetermined by the pore size does not act on the whole surface of the electrode. On the contrary, the surface is subdivided into small areas by a large number of bridge-like connections, with the oppositely disposed limitation of the gas-space. The bending moment which stresses the fine-pored layers is thus subdivided, with the result that the stress remains for below the limiting strength. The gas-diffusion electrode furthermore has the advantage that, except for the hollow profile 3 while serves as a holder frame and for gas-feed and current-take-off purposes, the whole surface of the electrode can be made use of electrochemically for current-generating purposes.

In FIGURE 2, the carrier 1 is shown in the form of a coarse-pored layer. The latter may take the form of a porous sintered member, fastened in the frame 3 by sintering. The fine-pored layers 2, 2 may likewise take the form of sintered members and be fastened in the frame.

In a preferred embodiment, a gas-diffusion electrode made of silver is produced in the manner hereinafter described for use as an oxygen electrode in an ion-conducting electrolyte in a fuel element. However, the invention is by no means confined to the specified metal and the specified use. On the contrary, all materials known for such uses may be employed in producing the gas-diffusion electrode. The electrode is also suitable for use the gases other than oxygen.

A substantially rectangular frame with rounded corners is bent up from a silver tube 3 of 5 mm. external diameter and 1 mm. wall thickness. The sides of the rectangle are about 100 mm. in length. One end of the tube 5 projects about 100 mm. beyond the frame. The other end of the tube is butt-soldered to the tube adjacent to said extension. Cylindrical apertures 4 with a diameter of about 1 mm. are drilled at intervals of about 5 mm. in the inner side of the tube. In a suitable pressing mould, the frame is filled with silver powder with a pore-forming water-soluble additive such as sodium sulphate or other salt, and pressed at about 500 kg./cm.$^2$, so that a layer 1, about 3 mm. thick is formed within the frame. A fine-pored layer of silver, 1 mm. thick, is then pressed on to each side of this layer in the same way forming the layers 2, 2. The material is homogeneously bonded in itself and with the frame by sintering at 550 to 600° C. for 2 to 5 hours. The pore-forming additive is removed from the layers by washing out. When tested at above the prescribed operating pressure, an electrode produced in the manner exhibited uniform gas-permeability over its whole surface. With electrodes of large surface area, it may be expedient to subdivide the frame by webs of the same or a different hollow profile, or even by webs of solid material. Likewise, the round hollow profile shown in FIGURE 2 may be replaced by a hollow profile of differing cross-section.

If the gas-diffusion electrode is intended for use as the end electrode in a fuel element, the outer of the two fine-pored layers may be replaced by an impermeable coating, or by sintering the middle coarse-pored layer on to a non-porous sheet-metal plate.

The difference in average pore sized between the inner carrier layer 1 serving as a gas-feed space and the fine-pored active layers 2, 2 must be made such that the difference between the gas-pressures imparting balance to the capillary pressures in the layers is at least as great as the difference in hydrostatic pressure over the whole vertical extent of the electrode immersed in the electrolyte.

The carrier in the form of a coarse-pored sintered member may also be replaced by a different suitable gas-permeable carrier. For example, a metal mesh network, gas-permeable in all direction, may be spot-welded to the frame. Fine-pored sintered members, preferably made of metal, are applied to the surface of this mesh network and made fast with the latter and with the frame, for example by being sintered on.

I claim:

Pressure-resistant gas-diffusion electrode for fuel cells comprising a gas-permeable plate-like carrier serving as a gas-feed space, two fine-pored conductive layers secured to the opposite faces of said carrier and adapted to be in contact with an electrolyte, a conductive hollow frame mechanically connected to all edges of said carrier and conductively connected to all edges of said fine-pored layers, said frame comprising apertures on its inner side directed towards said carrier and being provided with an extension for introducing gas and for current-take-off purposes.

References Cited by the Examiner

UNITED STATES PATENTS

| | | | |
|---|---|---|---|
| 2,175,523 | 10/1939 | Greger | 136—86.1 |
| 2,276,188 | 3/1942 | Greger | 136—86.1 |
| 2,901,523 | 8/1959 | Justi et al. | 136—86 |
| 2,947,797 | 8/1960 | Justi et al. | 136—120 |
| 2,969,315 | 1/1961 | Bacon | 136—120 |
| 3,012,086 | 12/1961 | Vahldieck | 136—86 |
| 3,035,998 | 5/1962 | Sommer et al. | 136—120 |
| 3,101,285 | 8/1963 | Tantram et al. | 136—120 |

FOREIGN PATENTS 871,950   7/1961   Great Britain.

JOHN H. MACK, *Primary Examiner.*